(12) United States Patent
Judd et al.

(10) Patent No.: US 9,503,175 B2
(45) Date of Patent: Nov. 22, 2016

(54) SATCOM DATA UNIT WITH WIRELESS DEVICE

(71) Applicant: Honeywell International Inc., Morristown, NJ (US)

(72) Inventors: Thomas D. Judd, Woodinville, WA (US); Sandra J. Howe-Ryberg, Renton, WA (US); Darshan Gandhi, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 133 days.

(21) Appl. No.: 14/299,078

(22) Filed: Jun. 9, 2014

(65) Prior Publication Data
US 2015/0222351 A1 Aug. 6, 2015

Related U.S. Application Data (60) Provisional application No. 61/934,995, filed on Feb. 3, 2014.

(51) Int. Cl.
*H04B 7/15* (2006.01)
*H04B 7/185* (2006.01)

(52) U.S. Cl.
CPC ...... *H04B 7/18506* (2013.01); *H04B 7/18513* (2013.01)

(58) Field of Classification Search
CPC .................. H04B 7/18506; H04B 7/18513
See application file for complete search history.

(56) References Cited

U.S. PATENT DOCUMENTS

| 6,741,841 B1 | 5/2004 | Mitchell |
| 8,255,112 B2 | 8/2012 | Conzachi et al. |
| 8,433,817 B2 | 4/2013 | Tamalet et al. |

(Continued)

FOREIGN PATENT DOCUMENTS

| EP | 2129006 | 12/2009 |
| WO | 0227975 | 4/2002 |

OTHER PUBLICATIONS

Feliz, "Cobham Introduces New Satcom System for Air Transport", "Retrieved Apr. 17, 2014 from Internet http://www.aviationtoday.com/av/topstories/Cobham-Introduces-New-Satcom-System-for-Air-Transport_79488.html#.UxhtqH-K", Jun. 17, 2013, pp. 1-2.

(Continued)

*Primary Examiner* — Mohammed Rachedine
(74) *Attorney, Agent, or Firm* — Fogg & Powers LLC (57) ABSTRACT

An aerospace communication system comprises a communication management unit; a first communication device configured to transmit and receive data over a first communication network; and a second communication device configured to transmit and receive data over a second communication network. The first communication device is coupled to a corresponding interface of the communication management unit. The second communication device is communicatively separated from the communication management unit by the first communication device such that the communication management unit is unaware of the second communication device. The first communication device includes routing logic configured to determine whether to send each message received from the communication management unit over the first communication network or to the second communication device for transmission over the second communication network.

21 Claims, 6 Drawing Sheets

(56) References Cited

U.S. PATENT DOCUMENTS

| | | |
|---|---|---|
| 8,578,037 B2 | 11/2013 | Nelson et al. |
| 2006/0030311 A1* | 2/2006 | Cruz .................... H01Q 1/246 455/431 |
| 2007/0027589 A1 | 2/2007 | Brinkley et al. |
| 2008/0182573 A1 | 7/2008 | Lauer et al. |
| 2010/0304739 A1 | 12/2010 | Rooks et al. |

OTHER PUBLICATIONS

European Patent Office, "Extended European Search Report from EP Application No. 15152196.0 mailed Jun. 18, 2015", "from Foreign Counterpart of U.S. Appl. No. 14/299,078", Jun. 18, 2015, pp. 15, Published in: EP.
European Patent Office, "Communication pursuant to Article 94(3) EPC from EP Applicaiton No. 15152196.0 mailed Aug. 26, 2016", Aug. 26, 2016, pp. 1-5, Published in: EP.

* cited by examiner

SATCOM DATA UNIT WITH WIRELESS DEVICE

CROSS-REFERENCE TO RELATED APPLICATIONS

This application claims priority to U.S. Provisional Patent Application No. 61/934,995, filed on Feb. 3, 2014 and entitled "SATCOM DATA UNIT WITH WIRELESS DEVICE", which is referred to herein as the '995 application and incorporated herein by reference.

BACKGROUND

Aerospace vehicles, such as aircraft, often need to communication with a ground station while in flight. Various technologies exist for enabling the air-to-ground communication. Such technologies include High Frequency radios, Very High Frequency radios, and Satellite communications, as known to one of skill in the art. Although new technologies are being developed to enable the air-to-ground communication over less expensive networks, many existing and new aircraft are not configured to utilize the newer technologies.

SUMMARY

In one embodiment, an aerospace communication system is provided. The aerospace communication system comprises a communication management unit, a first communication device configured to transmit and receive data over a first communication network; and a second communication device configured to transmit and receive data over a second communication network. The first communication device is coupled to a corresponding interface of the communication management unit. The second communication device is communicatively separated from the communication management unit by the first communication device such that the communication management unit is unaware of the second communication device. The first communication device includes routing logic configured to determine whether to send each message received from the communication management unit over the first communication network or to the second communication device for transmission over the second communication network.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
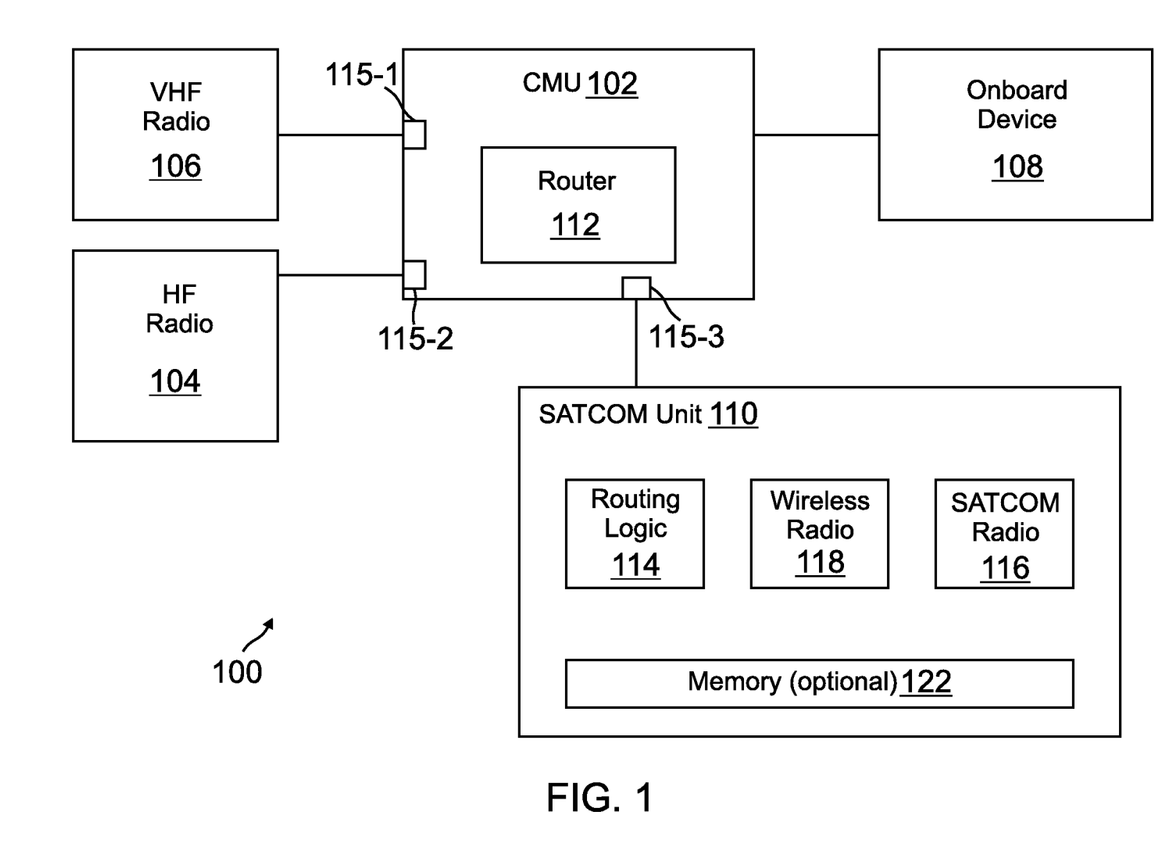
FIG. 1 is a block diagram of one embodiment of an exemplary aerospace communication system.

FIG. 1 is a block diagram of one embodiment of an aerospace communication system 100. System 100 includes Communication Management Unit (CMU) 102, a High Frequency (HF) radio 104, a Very High Frequency (VHF) radio 106, and one or more onboard devices 108. The HF radio 104 and VHF radio 106 are used to communicate data from an aircraft to a ground station using techniques known to one of skill in the art. In addition, although system 100 includes an HF radio 104 and a VHF radio 106, in this embodiment, it is to be understood that the HF radio 104 and/or the VHF radio 106 can be omitted in other embodiments.

The one or more onboard devices 108 can include, but are not limited to, a Flight Management Computer (FMC), Electronic Flight Bag, or other avionic equipment known to one of skill in the art, such as components of the Aircraft Communications Addressing and Reporting System (ACARS) or Aeronautical Telecommunications Network (ATN). Additionally, the onboard devices 108 can include user devices, such as cellular phones, computers, tablets, media players, etc.

The system 100 also includes an enhanced Satellite Communication (SATCOM) unit 110. In this embodiment the enhanced SATCOM unit 110 is a Line Replaceable Unit (LRU). An LRU is a unit which can be replaced without downing the aircraft for maintenance. The enhanced SATCOM unit 110 appears to the CMU 102 as a conventional SATCOM Data Unit (SDU). However, the enhanced SATCOM unit 110 includes additional functionality not present on conventional SDUs, as described in more detail below. The CMU 102 is coupled to each of the HF radio 104, the VHF radio 106 and the enhanced SATCOM unit 110 via respective interfaces 115. The CMU also includes a router 112 in order to route data communications to the appropriate device for communication to a ground station. In particular, the CMU 102 routes communications between the HF radio 104, the VHF radio 106, and the enhanced SATCOM unit 110. Exemplary criteria for routing the communications include availability of the corresponding network and/or cost of communicating over the corresponding network. Since the enhanced SATCOM unit 110 appears as a conventional SDU to the CMU 102, additional functionality is not required in the CMU 102 in order to utilize the additional functionality of the enhanced SATCOM unit 110.

The enhanced SATCOM unit 110 includes routing logic 114, a SATCOM radio 116 and an Internet Protocol (IP) wireless device 118. The SATCOM radio 116 communicates over a satellite communication network similar to a conventional SDU. As used herein, an IP wireless device is an electronic device which exchanges data or connects to the internet wirelessly using radio waves. For example, the IP wireless device 118 can be a device configured to communicate over a cellular network. Alternatively, the IP wireless device 118 can be a device configured to communicate using implementations of the Institute of Electrical and Electronics Engineers (IEEE) 802.16 family of wireless-networks standards, commonly referred to as the Worldwide Interoperability for Microwave Access (WiMAX), implementations of the IEEE 802.11 family of wireless-network standards, commonly referred to as Wi-Fi, or other wireless communication technologies, such as Aeronautical Mobile Airport Communications System (AeroMACS). In addition, in some embodiments, the IP wireless device 118 is can include more than one wireless radio. For example, in some embodiments, the IP wireless device 118 includes both a cellular radio and a Wi-Fi radio.

The routing logic 114 determines whether to transmit data via the SATCOM radio 116 or the IP wireless device 118. The routing logic 114 can be implemented using a processing unit, field programmable gate array, application specific integrated circuit, or other programmable device configured to process received messages according to specified instructions for routing the messages, as understood by one of skill in the art.

In some embodiments, certain messages may require transmission via a specific link. For those messages, the routing logic 114 provides the messages to the corresponding link. For example, if a message can only be transmitted via the SATCOM radio 116 but not IP Wireless device 118, then the enhanced SATCOM unit 110 ensures that those messages are transmitted via the SATCOM radio 116 only whether it is a Future Air Navigation System (FANS) ACARS message, ATN application over ATN message, or ATN over IP message, etc. For messages which do not require transmission over a specific network or link, the routing logic 114 determines which link to use based on criteria, such as, but not limited to, cost and availability of the corresponding networks, user preference, level of security, quality of service (e.g. cost, throughput, and/or reliability).

For example, if lower cost Wi-Fi or Cellular is available, then the message is sent via the lower cost link, in some embodiments. If the lower cost Wi-Fi or Cellular network is not available, then the message is sent via the SATCOM radio 116. In other embodiments, if the lower cost Wi-Fi or Cellular network is not available, a message can be stored in an optional memory 122 until the lower cost network becomes available. In addition, the IP wireless radio 118 can include logic/functionality to communicate using more than one technology. For example, in some embodiments, the IP wireless radio 118 is configured to be able to communicate over both a Wi-Fi connection and a cellular network connection.

In another example, user preferences can be used to determine which link to use. In some such embodiments a database or configuration file is loaded into the SATCOM unit 110 for use by the routing logic 114. The configuration file specifies which types of messages are to be sent over which links. In some such embodiments using a configuration file, safety critical messages are hardcoded to be transmitted via the SATCOM radio 116 only. Thus, while routing of non-safety critical messages can be specified via a configuration file, the safety critical messages, such as but not limited to FANS Air Traffic Control (ATC) messages, are hardcoded within the routing logic to be sent over the SATCOM radio 116 only. In addition, in other embodiments a menu can be displayed on the aircraft to enable a user to define which messages are associated with a given link. For example, a menu through a Multifunction Control Display Unit (MCDU) can be used to enable specification of specific links for certain types of messages (e.g. select a domain for a given message type).

The routing logic 114 can make a determination of whether to transmit data via the SATCOM radio 116 or the IP wireless device 118 based on the domain of the message (e.g. a domain specified in a configuration file, a hardcoded domain, or a domain specified through a user menu). For example, certain communications are considered part of the aircraft domain. The aircraft domain includes communications which are related to or are critical to the operation of the aircraft. Communications not in the aircraft domain are considered part of the open domain, such as, but not limited to, user data or non-essential communications. Thus, in some embodiments, the enhanced SATCOM unit 110 includes at least three interfaces: an ACARS over IP interface, a Broadband/IP datalink interface for the aircraft domain, and a Broadband/IP datalink interface for the open domain. Hence, in some embodiments, the IP wireless radio 118 is configured to support ACARS over IP.

Additionally, in some embodiments, the enhanced SATCOM unit 110 includes a security separation mechanism between the aircraft domain and the open domain similar to conventional SDUs. In other words, the SATCOM unit 110 includes mechanisms or procedures to ensure separation between messages of different domains such that messages in the open domain do not interfere with messages in the aircraft domain.

As stated above, from the perspective of the CMU 102, the enhanced SATCOM unit 110 appears to be a conventional SDU. Thus, the CMU 102 routes data to the enhanced SATCOM unit 110 as if it were a conventional SDU. However, the enhanced SATCOM unit 110 includes logic to determine whether or not to use the SATCOM network or a different wireless network, such as the less expensive cellular or Wi-Fi networks. The CMU 102 may be unaware if data is transmitted over the wireless network or the SATCOM network. In addition, in the uplink direction from the ground to the aircraft, the CMU 102 may be unaware of data being received via the wireless device 118. In other words, the interface from the SATCOM unit 110 to the CMU 102 appears to the CMU 102 as a standard SATCOM interface. For example, the format of messages received over the wireless device 118 can be modified in the SATCOM unit 110 such that the messages appear as standard messages received over the SATCOM radio 116.

By combining the IP wireless device 118 and the SATCOM radio 116 into a single physical unit, the enhanced SATCOM unit 110 reduces size and weight considerations as opposed to separate physical devices. Furthermore, the enhanced SATCOM unit 110 is backward compatible with existing devices on an aircraft. For example, the ability to communicate over Wi-Fi or Cellular is enabled without requiring changes to the existing CMU. In particular, the CMU does not need to have additional interfaces to support the IP wireless radios and there is less impact on the CMU as opposed to configuring the CMU to process signals from the IP wireless devices in addition to the other radios. Additionally, in some embodiments, the enhanced SATCOM unit 110 uses a shared antenna for providing both cellular and Wi-Fi. The enhanced SATCOM unit 110 uses a separate antenna for the SATCOM signals. In some embodiments, the enhanced SATCOM unit 110 also includes a memory or buffer for storing messages until a network is available or until a less expensive network is available for non-critical messages, as mentioned above.

Figure 2:
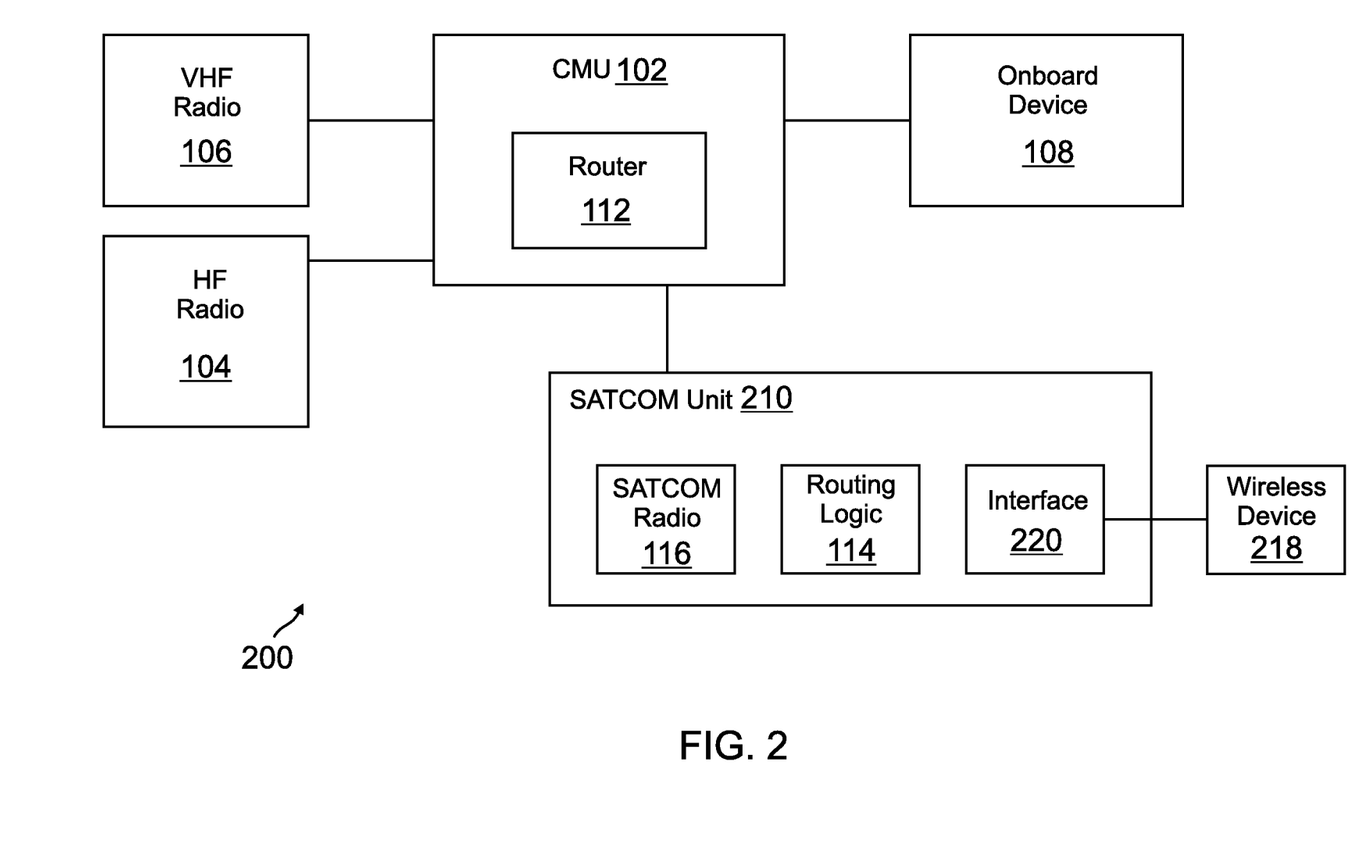
FIG. 2 is a block diagram of another embodiment of an exemplary aerospace communication system.

In the embodiment shown in FIG. 1, the SATCOM radio 116 and the IP wireless radio 118 are physically included in the same device. For example, a Wi-Fi and/or cellular card are included in the enhanced SATCOM unit 110 along with access to the additional antenna port. However, in other embodiments, the IP wireless radio is a separate device which is coupled to the enhanced SATCOM unit 110 via a corresponding interface, such as an Ethernet interface. One example of such an embodiment is shown in FIG. 2. In particular, in FIG. 2, the enhanced SATCOM unit 210 includes the routing logic 114 to determine if the message should be sent over the SATCOM network or over the IP wireless network. When the IP wireless device 218 is to be used, the enhanced SATCOM unit 110 routes the messages over the interface 220 to the IP wireless device 218. Thus, even though the IP wireless device 218 and the enhanced SATCOM unit 210 are physically separate devices in this embodiment, the CMU 102 may still be unaware of the IP wireless device 218. Thus, the exemplary configuration of FIG. 2 is still backward compatible and provides some of the same benefits as the exemplary configuration shown in FIG. 1.

Figure 3:
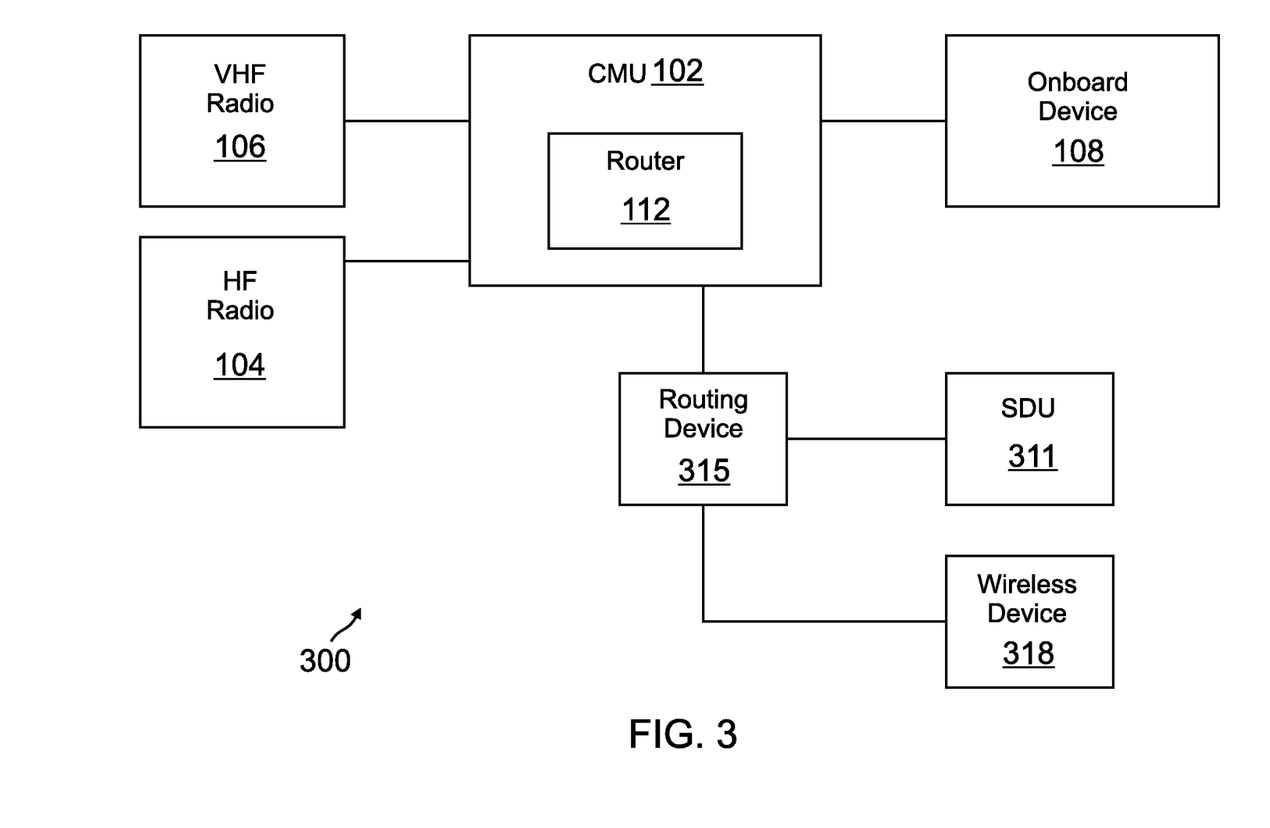
FIG. 3 is a block diagram of another embodiment of an exemplary aerospace communication system.

In another example embodiment involving separate devices shown in FIG. 3, the SDU 311 and the IP wireless device 318 are separate devices. In this embodiment, the SDU 311 is similar to a conventional SDU. However, the system 300 includes a routing device 315 between the CMU 102, the SDU 311 and the IP wireless device 318. The routing device 315 determines over which network to transmit the messages and provides the messages to the corresponding device. In particular, the routing device 315 includes routing logic similar to the routing logic 114 discussed above with respect to FIGS. 1 and 2.

Figure 6:
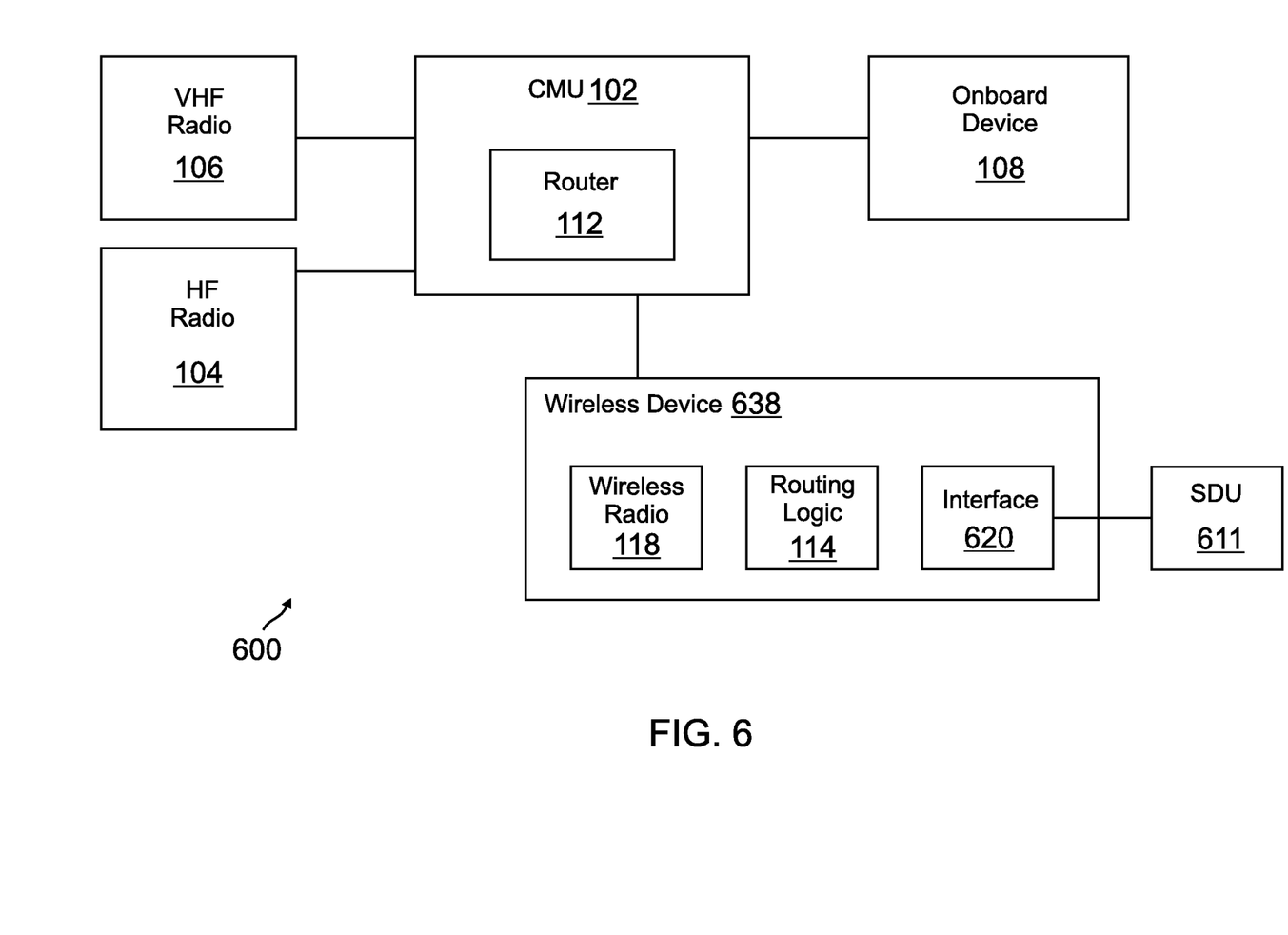
FIG. 6 is a block diagram of another embodiment of an exemplary aerospace communication system.

In another example embodiment involving separate devices shown in FIG. 6, the IP wireless device 618 and the SDU 611 are separate devices. In this embodiments, the SDU 611 is similar to a conventional SDU. However, in this embodiment, the routing logic 114 is included in the IP wireless device 618. The wireless device 618 is located between the CMU 102 and the SDU 611. The wireless device 618 includes an interface 620 to couple the wireless device 618 to the SDU 611. The routing logic 114 within the wireless device 618 determines over which network to transmit the messages. If the messages are to go over the wireless radio 118, the routing logic directs the messages to the wireless radio 118. If the messages are to be sent over the SDU 611, the routing logic 114 directs the messages over the interface 620 to the SDU 611. The interface between the IP wireless device 618 and the CMU 102 appears as a standard SATCOM interface to the CMU 102 for both downlink and uplink communication. Thus, in each of the examples shown in FIG. 2, FIG. 3 and FIG. 6, the routing logic is abstracted away from the CMU 102. Thus, in each of the examples of FIG. 2, FIG. 3 and FIG. 6, the use of the IP wireless device may not be known by the CMU 102 and some of the same advantages discussed above with respect to FIG. 1 are also provided in FIGS. 2, 3, and 6.

Figure 4:
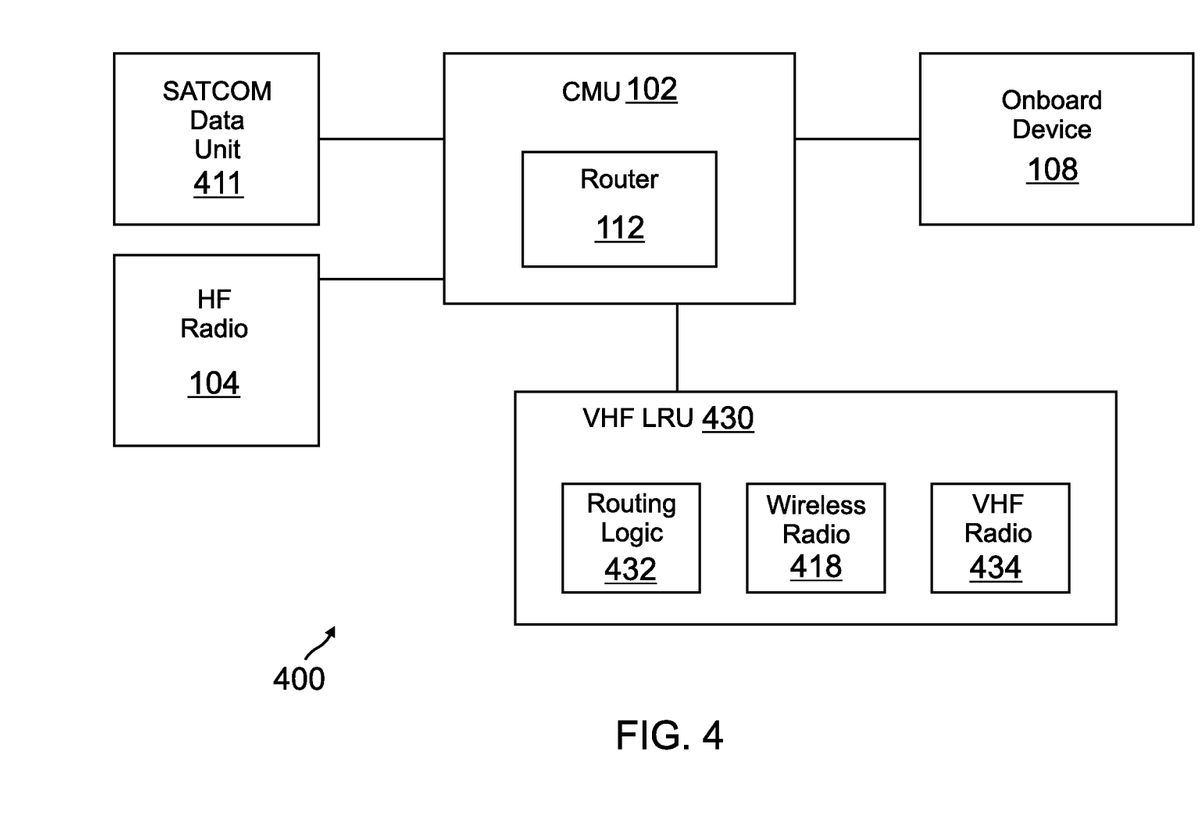
FIG. 4 is a block diagram of another embodiment of an exemplary aerospace communication system.

In addition, although the examples discussed above include combining an IP wireless device with a SATCOM radio, it is to be understood that the same techniques can be applied to other aircraft radios, such as the HF radio and/or the VHF radio. For example, as shown in FIG. 4, the enhanced VHF 430 includes routing logic 432, IP wireless device 418 and VHF radio 434. The VHF 430 can also be implemented as a line replaceable unit, similar to the enhanced SATCOM unit discussed above. The enhanced VHF unit 430 determines whether to use the IP wireless device 418 or the VHF radio 434, similar to the enhanced SATCOM unit discussed above. Thus, the embodiments described herein provide an enhanced radio unit configured with routing logic and one or more IP wireless devices. In addition, the exemplary configurations shown in FIGS. 2 and 3 can also be implemented with an HF radio or a VHF radio to abstract the routing logic away from the CMU 102.

Figure 5:
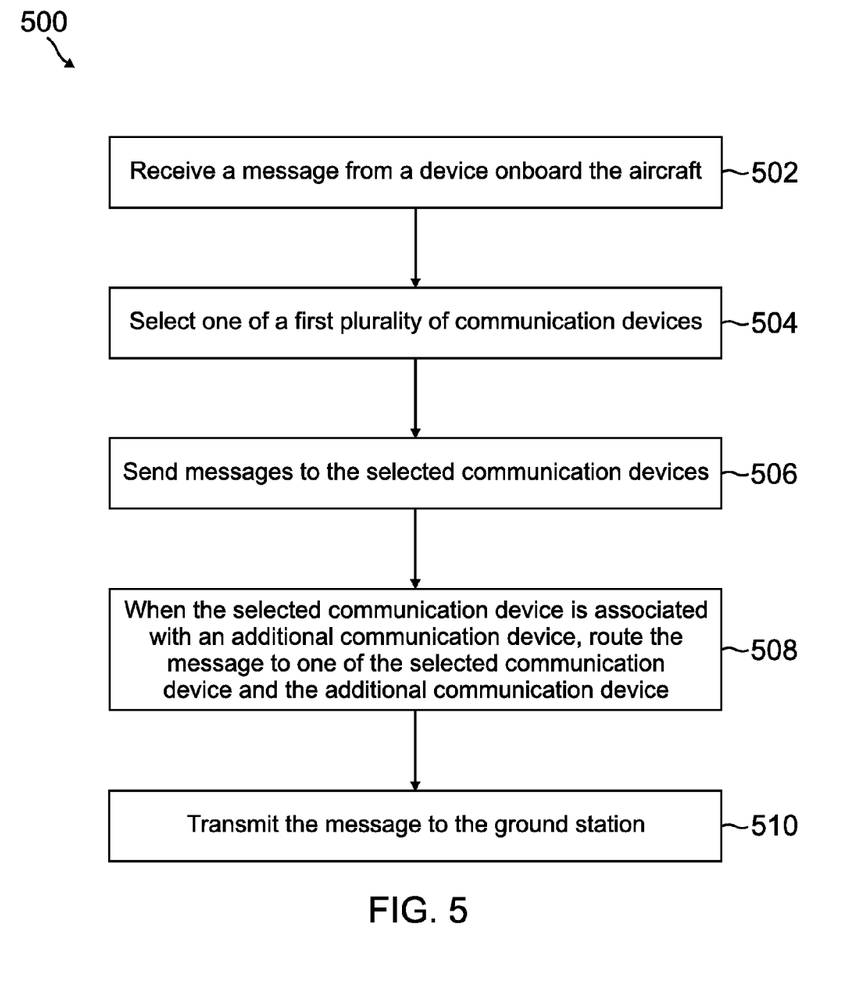
FIG. 5 is a flow chart depicting one embodiment of an exemplary method of communicating a message from an aircraft.

FIG. 5 is a flow chart of one embodiment of an exemplary method 500 of communicating a message from an aircraft. The method 500 can be implemented using one of the systems described above with respect to FIGS. 1-4, for example. At block 502, a message is received from a device onboard the aircraft. The message is received at a unit configured to route messages for transmission to a ground station. For example, a CMU can receive a message from an onboard device. Additionally, as discussed above, the onboard device can include one or more of a Flight Management Computer (FMC), Electronic Flight Bag, or other avionic equipment, such as components of the Aircraft Communications Addressing and Reporting System (ACARS) or Aeronautical Telecommunications Network (ATN). The onboard device can also include user devices, such as cellular phones, computers, tablets, media players, etc.

At block 504, one of a plurality of communication devices is selected for transmission of the message to a ground station. For example, as discussed above, a CMU includes a router to make decisions on routing messages to one of a plurality of communication devices. For example, in some embodiments, the first plurality of communication devices includes an HF radio, a VHF radio, and a SDU. The CMU includes a corresponding interface for each communication device in the plurality of communication devices.

One of the communication devices in the plurality of communication devices is associated with at least one additional communication device that does not have a corresponding interface in the CMU such that the CMU may be unaware of the at least one additional communication device. As used herein, the term "unaware" is defined to mean that the CMU is not required to have a record or other knowledge of the additional communication device for routing purposes. For example, the at least one additional communication device is not listed in a routing table of the CMU in some embodiments. Hence, from the perspective of the CMU, the device coupled to an interface of the CMU appears as a conventional communication radio (i.e. SDU, VHF radio, HF radio). Thus, an additional communication device can be added through the embodiments described herein without requiring changes to the CMU. As discussed above, the at least one additional communication device can include a cellular radio and/or a Wi-Fi radio.

At block 506, the message is sent from the CMU to the selected communication device over the corresponding interface. At block 508, when the message is sent over the interface corresponding to the communication device associated with the at least one additional communication device, the message is further routed to the at least one additional communication device or to the communication device associated with the at least one additional communication device. For example, as discussed above, in some embodiments, the associated communication device is an enhanced unit which can include routing functionality and/ or an IP wireless radio, such as a cellular radio or Wi-Fi radio. Thus, in some embodiments, the enhanced unit includes the additional communication device. In other embodiments, the enhanced unit includes an interface coupled to the additional communication device. Hence, the enhanced unit receives the message from the CMU and then routes the message to either the additional communication device or to the communication device selected by the CMU. Since the CMU is unaware of the additional communication device, the additional communication device is essentially hidden from the CMU by the enhanced unit.

Alternatively, in some embodiments, a router is placed between the communication device associated with the at least one additional communication device and the CMU. The router is also coupled to the at least one additional communication device. Hence, in such embodiments, when the message is sent to the communication device associated with the at least one additional communication device, the router makes the determination of whether to send the message to the at least one additional communication device or to the communication device associated with the at least one additional communication device. In each of the exemplary embodiments, the CMU is unaware of the at least one additional communication device.

At block 510, the message is transmitted to the ground station via the at least one additional communication device or the communication device associated with the at least one additional communication device.

Additional embodiments are described and shown in FIGS. 6-10. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an aerospace communication system comprising: a communication management unit; a first communication device configured to transmit and receive data over a first communication network; and a second communication device configured to transmit and receive data over a second communication network; wherein the first communication device is coupled to a corresponding interface of the communication management unit; wherein the second communication device is communicatively separated from the communication management unit by the first communication device such that the communication management unit is unaware of the second communication device; wherein the first communication device includes routing logic configured to determine whether to send each message received from the communication management unit over the first communication network or to the second communication device for transmission over the second communication network.

Example 2 includes the aerospace communication system of Example 1, wherein the first communication device includes one of a satellite communications (SATCOM) unit, a High Frequency (HF) radio, or a Very High Frequency (VHF) radio; and wherein the second communication device includes at least one of a cellular radio and a Wi-Fi radio.

Example 3 includes the aerospace communication system of any of Examples 1-2, wherein the first communication device is configured to route uplink messages received at the second communication device to the communication management unit such that the uplink messages appear to the communication management unit to have been received via the first communication device.

Example 4 includes the aerospace communication system of any of Examples 1-3, wherein the second communication device and the first communication device are included in the same line replaceable unit (LRU).

Example 5 includes the aerospace communication system of any of Examples 1-4, wherein the first communication device includes an interface configured to couple the first communication device with the second communication device, the second communication device being physically separate from the first communication device.

Example 6 includes the aerospace communication system of any of Examples 1-5, wherein the routing logic in the first communication device is configured to determine whether to send each message received from the communication management unit over the first communication network or to the second communication device based on at least one of a respective cost associated with each of the first and second communications networks, availability of the respective first and second communication networks, user preference, and a respective domain associated with each message received from the communication management unit.

Example 7 includes the aerospace communication system of any of Examples 1-6, wherein the first communication device includes a memory configured to store each respective message for which the communication network selected by the routing logic in the first communication device is unavailable, wherein the first communication device is configured to store each respective message until the selected communication network corresponding to each respective stored message becomes available.

Example 8 includes an aerospace communication unit comprising: an interface configured to communicatively couple the aerospace communication unit to a communication management unit; a first communication radio configured to transmit and receive data over a first communication network; and routing logic configured to determine whether to route messages received from the communication management unit to the first communication radio or to a second communication radio configured to transmit and receive data over a second communication network; wherein the routing logic is configured to determine whether to route messages to the first communication radio or the second communication radio independent of routing decisions performed by the communication management unit such that the second communication radio is hidden from the communication management unit.

Example 9 includes the aerospace communication unit of Example 8, further comprising a second interface configured to communicatively couple the aerospace communication unit to the second communication radio.

Example 10 includes the aerospace communication unit of any of Examples 8-9, wherein the aerospace communication unit includes the second communication radio.

Example 11 includes the aerospace communication unit of any of Examples 8-10, wherein the first communication radio comprises one of a high frequency (HF) radio, a very high frequency (VHF) radio, and a satellite communication (SATCOM) radio; and wherein the second communication radio comprises at least one of a cellular radio and a Wi-Fi radio.

Example 12 includes the aerospace communication unit of any of Examples 8-11, wherein the first communication radio is configured to route uplink messages received at the second communication radio to the communication management unit such that the uplink messages appear to the communication management unit to have been received via the first communication radio.

Example 13 includes the aerospace communication unit of any of Examples 8-12, wherein the routing logic is configured to determine whether to route the messages received from the communication management unit to the first communication radio or to the second communication radio based on at least one of a respective cost associated with each of the first and second communications networks, availability of the respective first and second communication networks, user preference, and a respective domain associated with each message received from the communication management unit.

Example 14 includes the aerospace communication unit of any of Examples 8-13, further comprising: a memory configured to store each message for which the communication network selected by the routing logic is unavailable until the selected communication network corresponding to each respective stored message becomes available.

Example 15 includes a method of communicating a message from an aircraft, the method comprising: receiving a message at a first unit configured to route messages for transmission to a ground station, the message from a device onboard the aircraft; selecting, at the first unit, one of a plurality of communication devices for transmission of the message to the ground station, the first unit including a corresponding interface for each communication device in the plurality of communication devices; wherein the plurality of communication devices includes a first communication device associated with at least one additional communication device that does not have a corresponding interface in the first unit such that the first unit is unaware of the at least one additional communication device; sending the message from the first unit to the selected communication device over the respective interface of the first unit corresponding to the selected communication device; and when the message is sent over the respective interface corresponding to the first communication device, routing the message after leaving the first unit to one of the at least one additional communication device or to the first communication device for transmission to the ground station.

Example 16 includes the method of Example 15, wherein the first communication device comprises one of a satellite communications (SATCOM) unit, a High Frequency (HF) radio, or a Very High Frequency (VHF) radio; and wherein the at least one additional communication device includes at least one of a cellular radio and a Wi-Fi radio.

Example 17 includes the method of any of Examples 15-16, further comprising routing, in the first communication device, uplink messages received at the at least one additional communication device to the first unit such that the uplink messages appear to the first unit to have been received at the first communication device.

Example 18 includes the method of any of Examples 15-17, wherein routing the message after leaving the first unit to one of the at least one additional communication device or to the first communication device for transmission to the ground station comprises: receiving the message at a router communicatively coupled between the first unit and the first communication device; and selecting one of the at least one additional communication device or the first communication device at the router.

Example 19 includes the method of any of Examples 15-18, wherein routing the message after leaving the first unit to one of the at least one additional communication device or to the first communication device for transmission to the ground station comprises: receiving the message at the first communication device; and selecting one of the at least one additional communication device or the first communication device at the first communication device.

Example 20 includes the method of Example 19, further comprising sending the message over an interface of the first communication device coupled to the at least one additional communication device when the at least one additional communication device is selected.

What is claimed is:

1. An aerospace communication system comprising:
    a communication management unit;
    a first communication device configured to transmit and receive data over a first communication network;
    a second communication device configured to transmit and receive data over a second communication network;
    wherein the first communication device is in communication with a corresponding interface of the communication management unit;
    wherein the first communication device is in communication with the second communication device;
    wherein the second communication device is communicatively separated from the communication management unit by the first communication device such that the communication management unit is unaware of the second communication device;
    wherein the first communication device includes routing logic configured to determine whether to send each message received from the communication management unit over the first communication network or to the second communication device for transmission over the second communication network; and
    wherein the aerospace communication system is configured for use onboard an aircraft.

2. The aerospace communication system of claim 1, wherein the first communication device includes one of a satellite communications (SATCOM) unit, a High Frequency (HF) radio, or a Very High Frequency (VHF) radio; and
    wherein the second communication device includes at least one of a cellular radio and a Wi-Fi radio.

3. The aerospace communication system of claim 1, wherein the first communication device is configured to route uplink messages received at the second communication device to the communication management unit such that the uplink messages appear to the communication management unit to have been received via the first communication device.

4. The aerospace communication system of claim 1, wherein the second communication device and the first communication device are included in the same line replaceable unit (LRU).

5. The aerospace communication system of claim 1, wherein the first communication device includes an interface configured to couple the first communication device with the second communication device, the second communication device being physically separate from the first communication device.

6. The aerospace communication system of claim 1, wherein the routing logic in the first communication device is configured to determine whether to send each message received from the communication management unit over the first communication network or to the second communication device based on at least one of a respective cost associated with each of the first and second communications networks, availability of the respective first and second communication networks, user preference, security level, quality of service, and a respective domain associated with each message received from the communication management unit.

7. The aerospace communication system of claim 1, wherein the first communication device includes a memory configured to store each respective message for which the communication network selected by the routing logic in the first communication device is unavailable, wherein the first communication device is configured to store each respective message until the selected communication network corresponding to each respective stored message becomes available.

8. An aerospace communication unit comprising:
   an interface configured to communicatively couple the aerospace communication unit to a communication management unit;
   a first communication radio configured to transmit data over a first communication network;
   routing logic configured to determine whether to route messages received from the communication management unit to the first communication radio or to a second communication radio configured to transmit data over a second communication network;
   wherein the routing logic is configured to determine whether to route messages to the first communication radio or the second communication radio independent of routing decisions performed by the communication management unit such that the second communication radio is hidden from the communication management unit; and
   wherein the aerospace communication system is configured for use onboard an aircraft.

9. The aerospace communication unit of claim 8, further comprising a second interface configured to communicatively couple the aerospace communication unit to the second communication radio.

10. The aerospace communication unit of claim 8, wherein the aerospace communication unit includes the second communication radio.

11. The aerospace communication unit of claim 8, wherein the first communication radio comprises one of a high frequency (HF) radio, a very high frequency (VHF) radio, and a satellite communication (SATCOM) radio; and
   wherein the second communication radio comprises at least one of a cellular radio and a Wi-Fi radio.

12. The aerospace communication unit of claim 8, wherein the first communication radio is configured to route uplink messages received at the second communication radio to the communication management unit such that the uplink messages appear to the communication management unit to have been received via the first communication radio.

13. The aerospace communication unit of claim 8, wherein the routing logic is configured to determine whether to route the messages received from the communication management unit to the first communication radio or to the second communication radio based on at least one of a respective cost associated with each of the first and second communications networks, availability of the respective first and second communication networks, user preference, security level, quality of service, and a respective domain associated with each message received from the communication management unit.

14. The aerospace communication unit of claim 8, further comprising:
   a memory configured to store each message for which the communication network selected by the routing logic is unavailable until the selected communication network corresponding to each respective stored message becomes available.

15. A method of communicating a message from an aircraft, the method comprising:
   receiving a message at a first unit onboard the aircraft, the first unit configured to route messages for transmission to a ground station, the message from a device onboard the aircraft;
   selecting, at the first unit, one of a plurality of communication devices onboard the aircraft for transmission of the message to the ground station, the first unit including a corresponding interface for each communication device in the plurality of communication devices; wherein the plurality of communication devices includes a first communication device associated with at least one additional communication device that does not have a corresponding interface in the first unit such that the first unit is unaware of the at least one additional communication device;
   sending the message from the first unit to the selected communication device over the respective interface of the first unit corresponding to the selected communication device; and
   when the message is sent over the respective interface corresponding to the first communication device, routing the message after leaving the first unit to one of the at least one additional communication device or to the first communication device for transmission to the ground station.

16. The method of claim 15, wherein the first communication device comprises one of a satellite communications (SATCOM) unit, a High Frequency (HF) radio, or a Very High Frequency (VHF) radio; and
   wherein the at least one additional communication device includes at least one of a cellular radio and a Wi-Fi radio.

17. The method of claim 15, further comprising routing, in the first communication device, uplink messages received at the at least one additional communication device to the first unit such that the uplink messages appear to the first unit to have been received at the first communication device.

18. The method of claim 15, wherein routing the message after leaving the first unit to one of the at least one additional communication device or to the first communication device for transmission to the ground station comprises:
   receiving the message at a router communicatively coupled between the first unit and the first communication device; and
   selecting one of the at least one additional communication device or the first communication device at the router.

19. The method of claim 15, wherein routing the message after leaving the first unit to one of the at least one additional communication device or to the first communication device for transmission to the ground station comprises:
   receiving the message at the first communication device; and
   selecting one of the at least one additional communication device or the first communication device at the first communication device.

20. The method of claim 19, further comprising sending the message over an interface of the first communication device communicatively coupled to the at least one additional communication device when the at least one additional communication device is selected.

21. An aerospace communication system comprising:
a communication management unit;
a first communication device configured to transmit and receive data over a first communication network;
a second communication device configured to transmit and receive data over a second communication network;
a routing device in communication with both the first communication device and the second communication device;
wherein the routing device is also in communication with a corresponding interface of the communication management unit;
wherein the routing device separates the second communication device from the communication management unit such that the communication management unit is unaware of the second communication device;
wherein the routing device includes routing logic configured to determine whether to send each message received from the communication management unit to the first communication device for transmission over the first communication network or to the second communication device for transmission over the second communication network; and
wherein the aerospace communication system is configured for use onboard an aircraft.

* * * * *